July 22, 1958  D. M. KING  2,844,105
CONVEYOR SYSTEMS
Filed June 10, 1952  2 Sheets-Sheet 1

INVENTOR
DONALD MAYER KING
By:
Haseltine, Lake & Co.
AGENTS

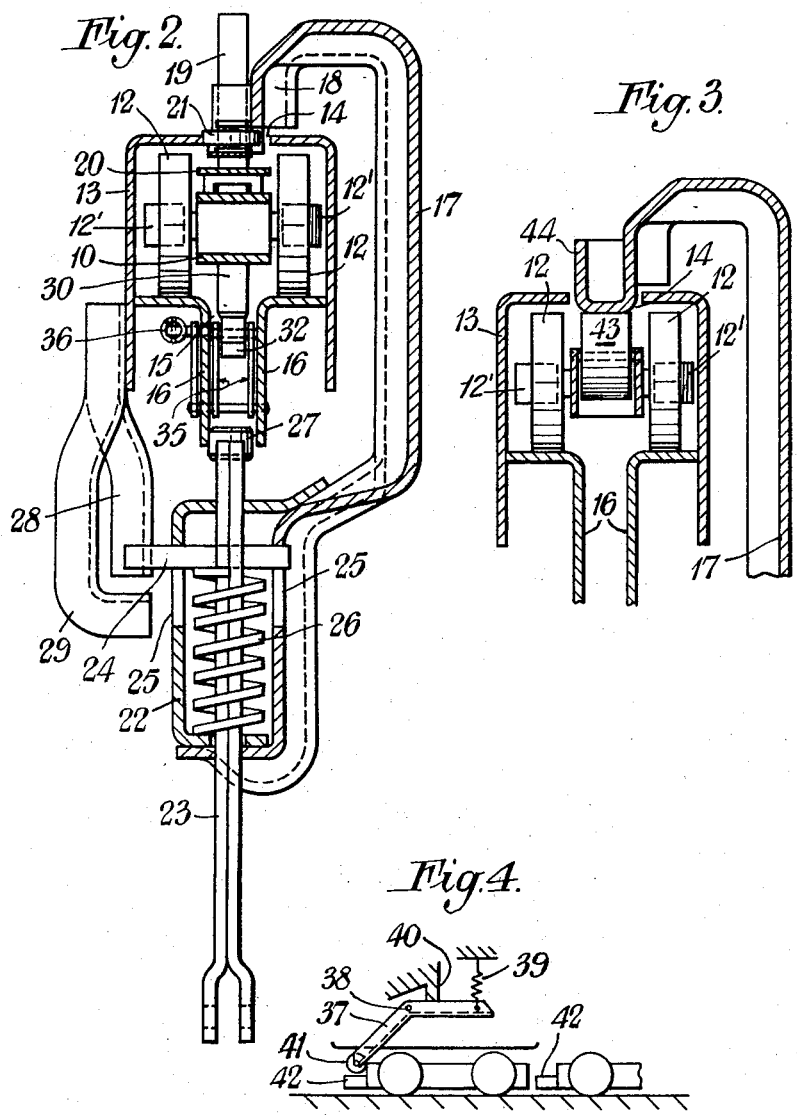

United States Patent Office 2,844,105
Patented July 22, 1958

2,844,105
CONVEYOR SYSTEMS
Donald Mayer King, Hitchin, England
Application June 10, 1952, Serial No. 292,627
Claims priority, application Great Britain June 13, 1951
9 Claims. (Cl. 104—93)

This invention relates to conveyor systems and in accordance therewith, such a system comprises a single endless conveyor chain to which a drive is imparted, a plurality of load carriers supported on said chain in such a manner that while normally driven thereby they may be stopped or moved relatively to said chain without interrupting the drive to the latter and means whereby each load carrier may be arrested at one or more predetermined points in the conveyor path when loaded and at one or more other predetermined points when unloaded.

In accordance with a further aspect of the invention a conveyor system comprises a single endless driving chain to which a drive is imparted, a plurality of load carriers supported on said chain in such a manner that while normally moved by the latter they may be stopped or moved relatively to said chain without interruption or variation of the drive thereto and means whereby a positive driving connection may be established between the chain and the load carriers when required. Preferably, means, such as pivoted dogs, movable pins or abutments, are associated with the chain and are adapted on operation to engage any load carrier and positively to locate the same in relation to said chain.

In order that the said invention may be clearly understood and readily carried into effect the same will now be more fully described with reference to the accompanying drawings, in which:

Figure 2 is a part sectional end elevational view looking from the right of Figure 1.

Figures 3 and 4 illustrate certain modifications which may be incorporated.

Figure 1:
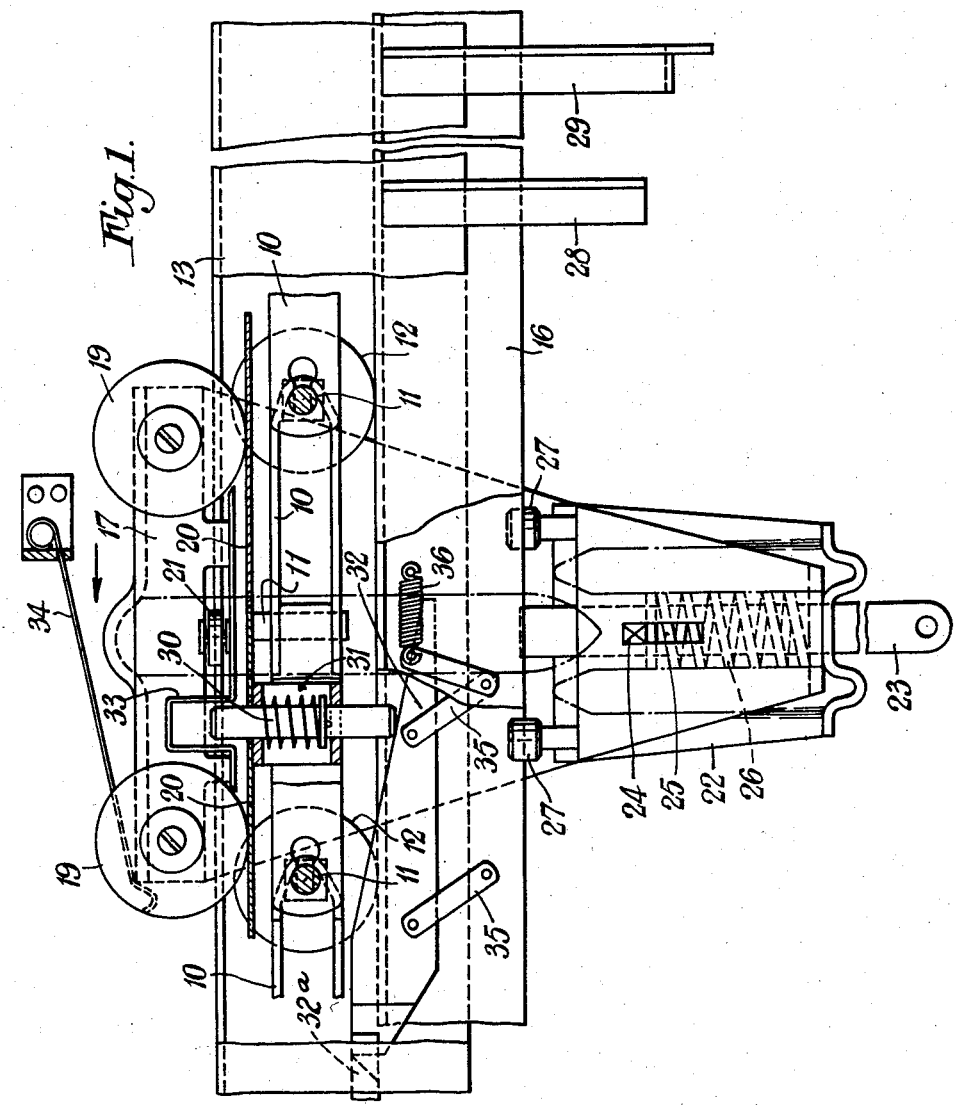
Figure 1 is a side elevational view showing a section of a conveyor with a load carrying trolley in position thereon.

In the embodiment illustrated in the drawings, the conveyor comprises an endless chain to which a drive is imparted in any convenient manner, such chain being adapted to run in a fixed overhead channel or track of box like section. As will be seen on reference to Figure 1, the conveyor chain is conveniently made up of a succession of U-shaped links 10 successively turned through 90° relatively to each other about their longitudinal axes so that the free ends of the legs of each link 10 embrace the bight portion of a next adjacent link and the successive links are interconnected by means of pins 11 carried by the free end portions of the legs of each link and extend through the bight portion of the next adjacent link, with the successive links being arranged so that successive ones will be displaced relatively to each other through 90°. With the chain extended horizontally as illustrated in Figure 1, the connecting pins 11 will be arranged alternately with their longitudinal axes horizontal and vertical. Carried by the chain 10 is a plurality of pairs of guide rollers 12 and 12', the rollers 12 being adapted to rotate about horizontal axes and to bear on running surfaces provided in the fixed overhead track 13 while the rollers 12' rotate about normally vertical axes and are adapted to bear against side wall surfaces of the track 13 for guiding the chain when the latter negotiates horizontal bends.

The track 13 is formed with a central longitudinally extending slot or passage 14 in the upper wall thereof, while the lower part incorporates a similar centrally disposed longitudinally extending slot 15 which is defined by depending wall portions 16 formed integrally with the running surfaces on which the rollers 12 are adapted to bear.

The conveyor chain is adapted to support and to impart a drive to a plurality of load carrying trolleys, one of which is shown in Figures 1 and 2. Each trolley comprises a frame or carriage 17 which is adapted to be disposed externally of the track 13 and at one side of the latter, the upper and lower portions of said frame or carriage being so formed as to overlie and underlie respectively the upper and lower surfaces of said track. The upper part of the frame or carriage is formed with a depending portion 18 which carries two rollers 19 arranged to rotate about normally horizontal axes, said rollers 19 being adapted to project through the slot or passage 14 in the upper surface of the track 13 and to engage or bear on plates 20 which are mounted on the chain to extend along the upper surface thereof. Also mounted on the depending portion 18 of the trolley frame or carriage is a roller 21 which is adapted to rotate about a normally vertical axis and is adapted to travel in the slot or passage 14 thereby to prevent undesired lateral movement of the trolley.

Slidably mounted in a casing 22 formed at the lower part of the trolley frame or carriage 18 which underlies the track 13 is the shank portion of a load carrying clevis element 23 which carries an outwardly projecting rod or the like 24 adapted to extend through slots 25 in said casing 22. A spring 26 is adapted normally to urge the clevis element 23 into an uppermost position wherein the rod or the like 24 will be in contact with the upper limit of the slots 25 as shown clearly in Figure 2. It will be appreciated that when a load is applied to the clevis element 23, the latter will move downwardly against the action of the springs 26, the extent of such downward movement being limited by the length of the slots 25. Also, mounted on the upper part of the casing 22 are two rollers 27, which are adapted to rotate freely about normally vertical axes and to run between the depending wall portions 16 of the track 13, thereby to prevent any undesired lateral movement of the lower part of the trolley. The construction is such that one end of the rod or the like 24 carried by the clevis element 23 will co-operate with fixed stops 28 and 29 which are disposed at differing levels and which, in the embodiment illustrated comprise arms or brackets affixed to the outer surface of the track 13, the arrangement being such that when the clevis element 23 is unloaded the rod or the like 24 will co-operate with the uppermost stop 28 but will be maintained clear of the stop 29 when said clevis element is loaded, said rod or the like will contact the lowermost stop 29 and will clear the stop 28.

The construction so far described is such that by suitable positioning of the stops 28 and 29 it will be possible to arrange for each load carrying trolley to be arrested at predetermined points along the conveyor path. For example, with the clevis element 23 supporting an article to be machined, said element will be in its depressed or lowermost position, such that the rod or the like 24 will abut against a stop, such as the stop 29, which is located at the lower level, such stop being conveniently disposed in proximity to the machine wherein the article is to be treated. Stoppage of the load carrying trolley will not affect the travel of the conveyor chain since the rollers 19 at the upper part of said trolley frame or carriage will merely revolve idly on the plates 20 carried by the chain which will continue to be driven. On removal of the article from the clevis element 23, the latter will move upwardly under the action of the spring 26, thereby to move the rod or the like 24 clear of the stop 29 so that the load carrying trolley may then be progressed along until it reaches a convenient loading point whereat said rod or the like will abut against a higher level stop, such as the stop 28 thereby again to arrest said trolley. On re-loading of the trolley, the clevis element 23 will be again depressed thereby clearing the rod or the like from engagement with the uppermost stop 28 so that said trolley may again be caused to travel forwardly to the next set of stops whereat the same cycle of operations will be repeated.

As indicated above while each load carrying trolley is supported on the conveyor chain and normally moved thereby, it is nevertheless capable of movement relatively to said chain due to the fact that it is supported on the latter by the rollers 19, which are mounted at the upper part of the trolley frame or carriage 18. Such an arrangement is satisfactory when the conveyor extends along a horizontal path but in the event of inclinations being present in the conveyor track, the load carrying trolleys would tend to move relative to the conveyor chain under the action of gravity In order to overcome this difficulty and to allow the load carrying trolleys to be driven up or down an inclined path, means are provided which are adapted on actuation positively to locate each load carrying trolley relative to the chain. In the embodiment illustrated spring loaded pins such as that indicated at 30, are carried by the chain at spaced points therealong, each pin being arranged with its axis vertical and being normally held in a lowered or depressed position wherein it will be clear of any trolley present on the chain. Each pin 30 is held in such lowered or depressed position by a coil spring 31 which bears, at one end, against a fixed stop at the underside of the plate 20 and, at its other end, against a collar on the pin 30. Disposed within the conveyor channel or track, i. e. in the space between the depending wall portions 16 is a ramp 32 against which the head of the pin 30 is adapted to engage on movement of the conveyor chain.

The ramp 32 is so designed as to cause the pin 30, when engaged therewith, to move upwardly through a slot in the platform formed by the plates 20 and into engagement with a slot or recess 33 formed in the depending portion 18 at the upper part of the trolley frame or carriage, thereby positively to locate the latter and to prevent movement thereof relatively to the chain. A ramp, such as is indicated at 32, will be provided at the commencement of each inclined section of the conveyor track, such ramp forming an extension of a running surface 32a which is adapted to maintain the pin 30 in engagement with the trolley over the whole of the inclined portion of the track.

In order to ensure engagement of one of the pins 30 with the slot or recess 33 in the trolley frame or carriage, it will be necessary at a predetermined point immediately prior to an incline in the track and appropriately positioned in relation to a ramp 32 to stop the trolley. Moreover, in order to avoid jamming of pins against the underside of a trolley, when the latter is not appropriately positioned in relation to a pin for the latter to enter the slot or recess 33, it will be necessary to arrange for the ramp 32 to be capable of retractive movement. One method of effecting the desired connection of the pins 30 with the trolleys is illustrated in Figures 1 and 2. In this case a spring stop 34 is provided which is adapted to contact the forward end of the trolley and to hold the same against movement. The ramp 32 which is adapted to co-operate with the pins 30 is supported by two pairs of links 35 which are pivotally mounted, at one end, on the depending wall portions 16 of the track and, at their other ends, are pivotally connected to the ramp so that rocking of the links 35 causes up and down movement of the ramp 32. An arm 35' is angularly fixed with respect to one of the pairs of links 35 and a spring 36 is connected between the arm 35' and an anchor pin on one of the wall portions 16 to urge the arm 35' to rock in the direction for raising the ramp 32. The arrangement illustrated is such that should a pin 30 be projected by the ram 32 into contact with the underside of the trolley (i. e. the pin being out of alignment with the slot or recess 33) the ramp 32 will yield downwardly sufficiently in opposition to the action of the spring 36, thereby to prevent the pin from being wedged or jammed hard against the underside of said trolley and to allow it to slide along such underside until it is either brought into a position wherein it can enter the slot or recess 33 or is moved clear of said trolley. It will be appreciated that once the pin 30 registers with the recess 33, the spring 36 will cause upward movement of the ramp 32 and also of the pin 30 to move the latter into engagement with the recess 33 in a trolley, and, thereafter, the drive imparted to the latter will be sufficient to carry it past the spring stop 34.

Instead of the provision of a stop, such as 34, referred to above, it may be feasible to adopt a construction, such as is indicated in Figure 4. Referring now to that figure, it will be seen that the stop comprises a double armed lever member 37 which is pivoted at 38 and is normally held by means of a spring 39 in contact with a stop 40. Mounted at the lower end of the member 37 is a freely rotatable roller 41. It will be appreciated that the member 37 will be effective to stop any trolley passing along the conveyor prior to engagement of a pin or the like 30 therewith. Upon establishment of a positive drive to the trolley, i. e. upon engagement of a pin 30 with the slot or recess 33, said trolley will be pulled past the stop member 37, the latter being swung upwardly against the action of its spring 39, which latter, however, serves to return said member to its operative position as soon as the trolley is clear, so that it (the member 37), will be in a position to arrest the next following trolley. It will be appreciated that the arrangement illustrated in Figure 4 will be such that the frictional force exerted, due to contact of a pin with the underside of a trolley, will be insufficient to move the trolley past the stop.

As will be seen from Figure 4, each trolley may be fitted with an extension piece 42 at its forward or rearward end. The provision of such extension pieces ensures that when two or more trolleys approach a vertical bend together, a space will be present between them which will accommodate the stop and thus allow for retention of the second trolley after passage of the first.

Instead of the construction illustrated in Figures 1 and 2 wherein the load trolleys are provided with wheels or rollers 19 which are adapted to engage plates 20 carried by the endless conveyor chain, it may obviously be desirable to adopt a construction such as is indicated in Figure 3, wherein the conveyor chain is provided with a plurality of rollers such as 43, which will serve to support the trolleys, the latter each being formed or provided with a shoe or the like 44 which is adapted to bear on two or more rollers associated with said chain. In this case, the trolley would, as before, be provided with guide rollers adapted to run between the depending wall portions 16 in order to prevent undesired lateral movement of the lower part of the trolley.

With the construction shown in Figures 1 and 2, it would be necessary to provide a cover track above the track 13 in order to retain the trolleys in position when negotiating vertical bends.

I claim:

1. A conveyor system comprising an endless chain, driving means for driving said endless chain, a load carrier, wheels riding on said endless chain and directly supporting said load carrier from said endless chain, said wheels being capable of rotation but being normally in non-rotating condition so that said driving means drives said load carrier by driving said endless chain, and stop means for engaging and stopping said load carrier, said wheels rotating to allow the undisturbed driving of said endless chain by said driving means upon engagement of said load carrier by said stop means.

2. A conveyor system as claimed in claim 1 comprising a receptacle in said load carrier, a member on said endless chain controllable for releasably engaging in said receptacle for positively coupling said load carrier to said endless chain.

3. A a conveyor system as claimed in claim 1 comprising a load bar for supporting a load, said load bar being resiliently coupled to said load carrier and having at least first and second positions, and wherein said stop means includes a first stop for engaging said load bar in the first position and a second stop for engaging said load bar in the second position to cause relative movement of said load carrier and said endless chain.

4. A conveyor system comprising a rigid track of box-like section having longitudinally extending passages in the upper and lower walls thereof, an endless driven chain travelling in said track, means on said chain to provide a substantially continuous running surface extending along the length thereof and at least one load carrier having means thereon engaging said chain and directly supporting the load carrier from the latter, said load carrier comprising a rigid frame disposed externally of the track and having upper and lower portions overlying and underlying respectively the upper and lower walls of said track, said means directly supporting the load carrier from the chain including roller means carried by said upper portion of said carrier frame and engaging the running surface on said chain to cause movement of the load carrier with the chain, means on said track for engaging and causing the load carrier to be halted without interrupting the drive to the chain, means affixed to both said upper and lower portions of said carrier frame to prevent undesired lateral movement of the latter relatively to said track and a load carrying member coupled to the lowermost portion of said carrier.

5. A conveyor system comprising a rigid track of box-like section having longitudinally extending passages in the upper and lower walls thereof, an endless driven chain travelling in said track, means to form a substantially continuous running surface extending along the length of said chain, at least one load carrier having means thereon engaging said chain and directly supporting the load carrier from the latter, and two sets of fixed stops disposed adjacent the path of movement of the carrier, the stops of one set being disposed at a higher level than the stops of the second set, said load carrier comprising a rigid frame disposed externally of the track and having upper and lower portions overlying and underlying respectively the upper and lower walls of said track, said means directly supporting the load carrier from the chain including roller means carried by said upper portion of said carrier frame to engage the running surface on said chain to normally cause movement of the load carrier with the chain while permitting the load carrier to be halted at any time without interrupting the drive to the chain, further roller means carried by said upper and lower portions of said carrier frame and disposed in the passages in the upper and lower walls respectively of the track, thereby to engage with the latter to prevent undesired lateral movement of the carrier relatively to said track, a load supporting member coupled to the lowermost portion of said load carrier frame to depend therefrom while being capable of limited upward and downward movement relatively thereto and engageable means connected to said load carrying member so that when said member is in its uppermost position said engageable means engages any of the stops of the set at the higher level and when said member is in its lowermost position said engageable means engages any of said stops of the set at the lower level thereby to arrest the carrier.

6. A conveyor system as in claim 5, wherein resilient means are coupled to the load supporting member, said resilient means normally urging said member into its uppermost position.

7. A conveyor system as in claim 5, in which means are coupled to the chain and controllable to couple the load carrier to said chain for momentarily preventing relative movement between said load carrier and chain.

8. In a conveyor system as in claim 5, abutment means on the chain movable into and out of an operative position, means on the load carrier with which said abutment means engages when the latter is in said operative position to ensure positive location of said carrier relatively to said chain and means adjacent the path of movement of the load carrier to guide said load carrier in order to ensure engagement between said abutment means and said means on said load carrier for engagement with said abutment means.

9. In a conveyor system as in claim 5, abutment means on the chain movable into and out of an operative position, means on the load carrier for engaging said abutment means when the latter is in said operative position to ensure positive location of said carrier relatively to said chain, means adjacent the path of travel of the load carrier to guide the latter to ensure engagement between said abutment means and said means on said load carrier for engaging said abutment means and means to effect movement of said abutment means into and from the operative position when required.

References Cited in the file of this patent

UNITED STATES PATENTS

| | | |
|---|---|---|
| 1,496,444 | Braley | June 3, 1924 |
| 1,778,484 | Da Costa | Oct. 14, 1930 |
| 1,780,224 | Da Costa | Nov. 4, 1930 |
| 1,781,655 | Cowley et al. | Nov. 11, 1930 |
| 1,920,774 | Webb | Aug. 1, 1933 |
| 1,935,711 | Hecox et al. | Nov. 21, 1933 |
| 2,187,498 | Landahl | Jan. 16, 1940 |
| 2,485,215 | Rose | Oct. 18, 1949 |
| 2,494,009 | Sharp | Jan. 10, 1950 |
| 2,619,916 | Rainier | Dec. 2, 1952 |
| 2,633,088 | King | Mar. 31, 1953 |
| 2,679,810 | Schutt | June 1, 1954 |
| 2,782,727 | King | Feb. 26, 1957 |
| 2,812,724 | King | Nov. 12, 1957 |